United States Patent [19]

Newkirk et al.

[11] Patent Number: 4,872,935
[45] Date of Patent: Oct. 10, 1989

[54] APPARATUS AND METHOD FOR BONDING A PLASTIC CONTAINER AND SPOUT

[75] Inventors: Raymond K. Newkirk; Richard L. Batzlaff, both of Plymouth, Minn.

[73] Assignee: Forward Technology Industries, Inc., Minneapolis, Minn.

[21] Appl. No.: 276,888

[22] Filed: Nov. 28, 1988

[51] Int. Cl.⁴ .................... B29C 65/20; B30B 15/34
[52] U.S. Cl. ........................ 156/250; 156/309.9; 156/499; 156/514; 156/583.1; 493/203; 493/213
[58] Field of Search ............. 156/69, 250, 261, 304.6, 156/309.9, 499, 513, 514, 583.1; 83/171; 219/229; 220/85 F, 85 SP; 493/203, 213

[56] References Cited

U.S. PATENT DOCUMENTS

| | | | |
|---|---|---|---|
| 2,122,368 | 6/1938 | Engler | 83/862 |
| 2,516,609 | 7/1950 | Woodard | 83/16 |
| 3,069,303 | 12/1962 | Scholle | 156/513 |
| 3,075,573 | 1/1963 | Piazze | 156/513 |
| 3,355,340 | 11/1967 | Calvert et al. | 156/514 |
| 3,396,616 | 8/1968 | Wright | 83/16 |
| 3,434,908 | 3/1969 | MacDonald | 156/514 |
| 3,498,868 | 3/1970 | Saumsiegle | 156/309.9 |
| 3,501,618 | 3/1970 | Spranger et al. | 219/384 |
| 3,783,080 | 1/1974 | Goglio | 156/514 |
| 4,507,168 | 3/1985 | Konaka | 156/309.9 |
| 4,695,337 | 9/1987 | Christine | 156/514 |

Primary Examiner—Michael Wityshyn
Attorney, Agent, or Firm—Haugen and Nikolai

[57] ABSTRACT

An apparatus for forming a bond between a plastic fill spout and a plastic container immediately after forming a bore through the container, includes a tool with a bore forming platen at its leading edge, a trailing end platen at its opposite end, and an intermediate spacer of an insulative material for thermally isolating the bore forming and trailing end platens. A longitudinally reciprocable fixture supports the spout in a longitudinal orientation to move the spout toward and away from the container, and a second fixture supports the tool in axial alignment with the spout and for longitudinal movement toward and away from the container, with the bore forming platen nearest the container. The tool is moved against the container and the bore forming platen heated, then moved through the container wall to provide the bore. The trailing end platen is positioned against the container to heat a rim of the container surrounding the bore, and a lead end of the spout is moved against the trailing platen, whereupon the lead end and rim are heated and fused simultaneously. The tool and its supporting fixture can be withdrawn transversely to permit longitudinal movement of the spout into engagement with the rim portion immediately after heating. Subsequent cooling of the lead end and rim forms the bond.

11 Claims, 1 Drawing Sheet

APPARATUS AND METHOD FOR BONDING A PLASTIC CONTAINER AND SPOUT

BACKGROUND OF THE INVENTION

This invention relates to the fusion bonding of articles constructed of plastic, and more particularly to boring a fill opening in a molded plastic container or other workpiece, and forming a fusion bond between a plastic fill spout and a rim portion about the bore.

Fusion bonding, also known as hot plate welding, is a well known technique for establishing strong bonds between plastic members. Generally, the articles to be bonded are positioned spaced apart from one another with the surface portions to be bonded aligned and facing one another. A heating plate then is interposed between the articles and in contact with the surfaces to be bonded in order to form a fused or plasticized layer of the plastic comprising the articles. Immediately after heating, the platen is withdrawn and the articles are brought together under pressure and allowed to cool to form the bond.

This application is concerned with a particular application of the fusion bonding process, namely the attachment of a tubular spout to a container, for example a gas tank in which the spout is to be employed as a filler spout for the tank. It has been found feasible to form a bore in a container by drilling, then securing the spout to the container in a rim area about the bore. This approach, however, is subject to certain difficulties. Foremost among these is contamination in the form of plastic chips or shavings deposited into the container in the course of machine-forming the bore. Such contamination can cause damage to a vehicle when the container is to be used as a gasoline tank. Alternatively, the shavings and chips give rise to an additional manufacturing step of cleaning the container, which adds to manufacturing time and cost while not assuring complete removal of fragments.

Further, as machine-forming of bores typically involves drill bits or other rotating cutting tools, the profile of the bore typically must be circular. Machine-forming of the bore is accomplished independently of the fusion process, and thus an intermediate spout alignment step is required for the desired positioning of the spout with respect to the container.

Among various known fusion bonding techniques are a few which involve forming openings or bores substantially contemporaneously with fusing. For example, U.S. Pat. No. 3,075,573 (Piazze) shows a system for punching cutouts in sheets of thermoplastic film material, and bonding the sheets together in the areas surrounding the cutouts. A heated dye is employed to form the bore and the fusion bond in a single operation. The pair of sheets to be bonded are pre-aligned, in the sense that the sheets are contiguous during the operation. A process for forming bores in plastic molded parts is disclosed in U.S. Pat. No. 3,501,618 (Spranger). An electrode is pressed into a plastic article, and a high voltage arc is formed in the plastic article between that electrode and another while a stream of gas is passed in the spark gap between the electrodes. While the above techniques are satisfactory in certain respects, they fail to adequately address needs particular to fusion bonding plastic spouts and containers and forming the required bores in such containers.

Therefore, it is an object of the present invention to provide an apparatus for forming a bore through a wall of a container without forming chips, shavings and the like, and for fusing a rim portion about the bore and a corresponding end portion of a tubular spout to be joined to the container at the rim portion.

Another object of the invention is to provide a fusion bonding apparatus that facilitates alignment of a bore formed in a plastic container and a spout to be joined to the container about the bore, and further permits the selection of a wide variety of profiles for the bore and spout.

Yet another object is to provide a process for forming a bore through the wall of a molded plastic container, without depositing chips, shavings or other plastic fragments in the container, and for aligning and fusion bonding an end of the spout to a container rim area about the bore.

SUMMARY OF THE INVENTION

To achieve these and other objects, there is provided an apparatus for forming a fusion bond between a container and a tubular spout constructed of a plastic. The apparatus includes a first fixture for supporting a plastic tubular spout in a longitudinal disposition and in spaced apart relation to a plastic container. The fixture is reciprocable to move the spout longitudinally toward and away from a generally transverse container wall segment. A heating tool is provided, with an inner end segment and an outer end segment axially aligned with and spaced apart from one another. The profile of the inner end segment corresponds to a desired profile of a bore to be formed in the container, while the profile of the larger outer end segment corresponds to the transverse profile of the tubular spout. A first heating element is provided for heating the inner end segment, and a second heating element is provided for heating the outer end segment. A second fixture supports the heating tool in a longitudinal disposition, axially aligned with the tubular spout and disposed between the spout and container. The second fixture is reciprocable to move the tool longitudinally toward and away from the container wall section to enable the forming of a bore through the wall section, having the selected profile of the inner end segment. The second fixture further is movable transversely to remove the heating tool from axial alignment, thus to permit longitudinal movement of the spout into an engagement with a rim portion of the container wall section surrounding the bore.

Preferably, the inner and outer end segments are annular in their horizontal profiles, and constructed of a highly thermally conductive material, for example metals such as aluminum or bronze. The heating tool advantageously includes a center shank or spacer between the inner and outer end segments. The spacer should be a thermally insulative material, for example a ceramic, to ensure these end segments can be heated independently of one another to substantially different selected temperatures.

The inward end portion of the inner end segment of the tool can be provided with a concavity to enhance formation of the bore. In particular, an annular flange can depend inwardly from the periphery of the inward end of the segment. Further, a centrally disposed opening can be provided, running longitudinally through the tool. These features facilitate the formation of bores, first by increasing the precision and accuracy of the bores, and secondly by allowing the plastic slug material to penetrate the inside of the tool during the boring operation.

The apparatus is particularly well suited to be utilized in a process for bonding a tubular spout to a molded container. The process includes the steps of:

supporting a tubular spout in a longitudinal disposition and in a spaced apart relation to a transverse wall section of a plastic container;

supporting a boring tool element between the tubular spout and the container wall section, and in axial alignment with the spout;

heating the bore forming means to a temperature sufficient to rapidly melt the plastic, and advancing the bore forming means longitudinally toward the container wall section until the bore forming means travels through the container wall section to form a bore therethrough;

positioning a heating means against a rim area of the container wall section surrounding the bore, and longitudinally advancing the spout to position a lead end of the spout against the heating tool element;

heating the heating tool element above the fusion temperature of the plastic to simultaneously fuse the rim area and the lead end; and withdrawing the heating tool element and then longitudinally advancing the spout until the lead end and rim area engage, and allowing the lead end and rim area to cool, thereby to bond the spout and container.

To facilitate formation of the bore, the bore forming means is heated to a temperature well above the fusion temperature of the plastic. For example, in the case of a polypropylene container and spout, the bore forming means is heated to a temperature of about 800° F. The heating means, on the other hand, is heated to a significantly lower temperature, just above the fusion temperature of the plastic.

There is a time/temperature relationship which depends upon the thickness of the container wall, as well as the rate of heat displacement away from the heating tool and bore forming tool, in that lower temperatures for these heating members result in more time required for the bonding process.

Preferably the heating tool element and bore forming tool element are axially aligned with the spout prior to formation of the bore. This is readily accomplished when these elements comprise integral segments of a single heating tool, with their simultaneous alignment being accomplished merely by aligning the tool.

Typically, the entire alignment and bonding process can be accomplished in a matter of seconds. The bore is formed by fusing the plastic, which avoids creation of chips, shavings or other fragments, thus to substantially eliminate contamination. Since the bore is formed without rotating the tool, the bore can have numerous specially selected or customized profiles, for example hexagonal or rectangular. Further, a single aligning step not only properly positions the bore to be formed, but further aligns the heating element or platen with the spout. In particular, following formation of the bore the tool simply is advanced further to position the heating tool element against the rim portion, with the opposite end of the heating tool element positioned to receive the spout. Thus, the presently disclosed apparatus and process reduce the time and cost involved in forming fusion bonds of plastic containers and spouts, and enhance the quality of the bonds in terms of greater precision and reduced contamination.

IN THE DRAWINGS

For a better understanding of the above and other features and advantages, reference is made to the following detailed description and the drawings, in which.

DETAILED DESCRIPTION OF THE PREFERRED EMBODIMENT

Figure 1:
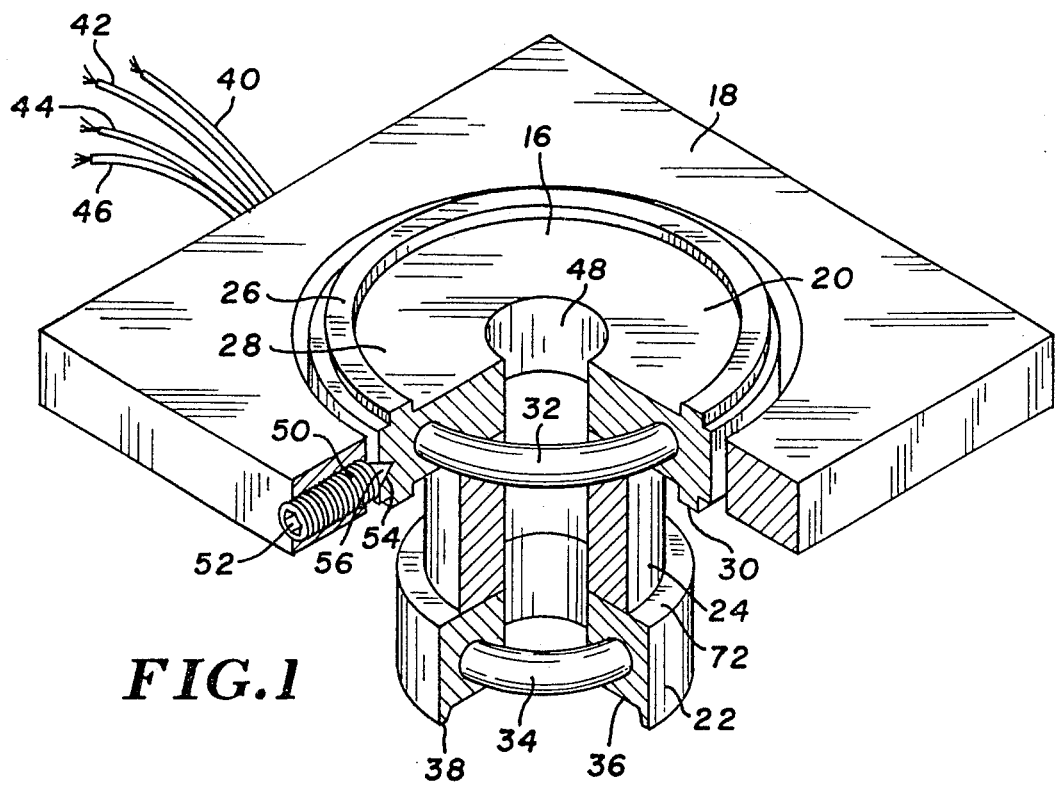
FIG. 1 is a perspective view of a heating tool and fixture constructed in accordance with the present invention.

Turning now to the drawings, there is shown in FIG. 1 a heating and bore forming tool 16 and a fixture or carrier 18 for supporting the tool. Heating tool 16 is symmetrical on a vertical axis, and includes an annular upper heating platen or segment 20, an annular lower heating platen or segment 22, and an intermediate spacer or shank 24 between platens 20 and 22.

Upper platen 20 is the larger of the two platens, and preferably is formed of aluminum or other highly thermally conductive material. An annular relief or ridge 26 is formed above a top surface 28 of the upper platen, and a corresponding ridge 30, equal in diameter to ridge 28, is projected below the platen bottom surface. An annular electrical heating element 32 is utilized to heat upper platen 20 to a selected temperature.

Lower platen 22, smaller in diameter than the upper platen, preferably is constructed of bronze rather than aluminum, as it is to be subject to substantially higher temperatures than the upper platen. An electrical heating element 34 is provided in order to heat the lower platen. Further, lower platen 22 is provided with a concavity at its bottom as indicated at 36. In particular, an annular flange 38 depends downwardly from the periphery of the platen. An electrical cable 40 and thermocouple 42 respectively supply electrical power to heating element 32 and control the power so that the upper platen is maintained at its selected temperature. A cable 44 and thermocouple 46 perform the same respective functions in connection with heating element 34.

Spacer 24 provides a desired distance between upper platen 20 and lower platen 22, and preferably is constructed of a highly thermally insulative material such as ceramic, so that the platens can be maintained at substantially different temperatures without influencing the temperature of one another. Openings through platens 20 and 22 and spacer 24 are axially aligned to form a continuous central aperture 48 running longitudinally, i.e. vertically, through tool 16.

Tool 16 is supported integrally with respect to fixture 18 by four gimbal fasteners, one of which is shown at 50. Gimbal fastener 50 includes external threads which engage internal threads formed in the fixture (not shown). An allen head 52 is formed in the fastener to enable its rotation, thus to horizontally or transversely adjust the gimbal fastener position. The fasteners are adjusted to provide fine or accurate alignment of tool 16 with respect to fixture 18. If desired, an indentation or cutout can be provided in upper platen 20 as shown at 54, to receive a correspondingly shaped tip 56 of gimbal fastener 50. Similar cutouts can accommodate tips of the remaining fasteners, to ensure a secure and accurate mounting of the tool.

Figures 2, 3:
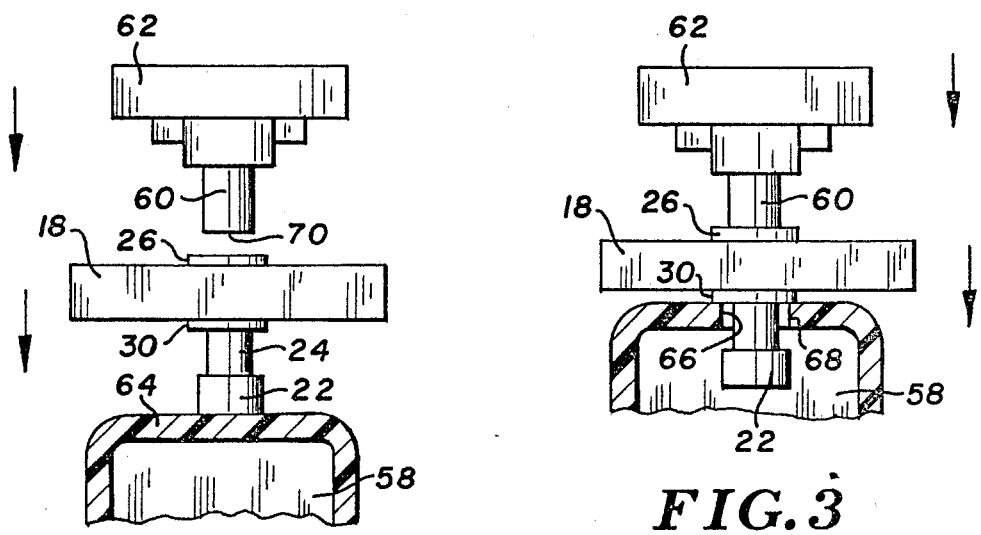
FIG. 2 is a schematic elevation of the tool and fixture positioned between a plastic container and tubular spout.
FIG. 3 is a view similar to FIG. 2, showing the apparatus after a bore has been formed in the container.

In FIG. 2, tool 16 and fixture 18 are mounted between a blow-molded container 58 and a tubular spout 60 releasably held in a fixture 62. The container and spout both are constructed of plastic, for example polypropylene. Container 58 is shown in section and includes a wall approximately ¼" thick, including a transverse or horizontal wall section 64 directly beneath lower platen 22. Fixture 18 is reciprocable longitudinally, so as to move tool 16 vertically toward and away from container 58. Similarly, fixture 62 is reciprocable to move spout 60 vertically toward and away from the container. Fixture 18 further is movable horizontally, so that tool 16 and the fixture can be removed from between the spout and container, thus to enable vertical movement of the spout into surface engagement with the container. The means for providing such movement are known to those skilled in the art and not discussed further.

Figure 4:
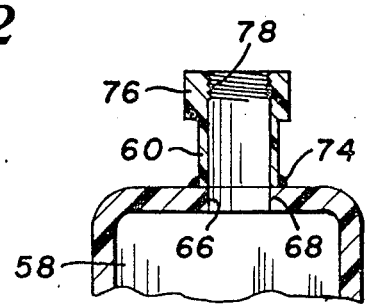
FIG. 4 shows the fusion bond created between the spout and container.

Use of the tool to form a fusion bond of spout 60 with container 58 is perhaps best understood in consideration with FIGS. 2-4. Initially, fixtures 18 and 62 are positioned as shown in FIG. 2, to axially align tool 16 and spout 60 over a desired bore location at container wall section 64. Tool 16 is disposed between the container and spout, and is moved by fixture 18 vertically downward until lower platen 22 contacts the container as shown in FIG. 2.

At this point the boring operation begins. Electrical heating element 34 is actuated to raise the temperature of lower platen 22 substantially above the melting temperature of the plastic, for example to a temperature of about 800° F. when the plastic is polypropylene. In general, the temperature of platen 22 is preferably at least 300° F. above the fusion temperature of the plastic. The platen temperature, however, also must be maintained below the flashpoint of the plastic involved. With platen 22 heated, fixture 18 moves tool 16 progressively downwardly until the lower platen has completely passed through container wall section 64 to form a bore 66.

Given its high temperature, lower platen 22 can be moved rapidly through the container wall to form the bore, passing through the ¼" wall thickness in approximately twenty seconds. Also, as the platen forms the bore by melting the plastic rather than by a machining operation, no chips or fragments are formed to enter into the container, and there is no need to rotate the tool, or in any other manner move the tool other than its longitudinal travel.

In addition, flange 38 and aperture 48 cooperate to ensure that no portion of the slug removed to form bore 66 is deposited into container 58. More particularly, flange 38 contacts the container first, fusing an annular area of the top of the container. As this annular region softens and permits tool 16 to descend, the liquefied plastic, under pressure between the tool and container, is driven radially inwardly of the tool toward opening 48, and proceeds up the opening. Flange 38 substantially prevents outward travel of the liquefied plastic under pressure. The inward flow of the plastic proceeds as platen 22 progresses through the container wall and finally forms an annular discontinuity in the bottom of container wall section 64 coincident with the flange, whereupon formation of the bore is complete.

Following bore formation, tool 16 is not withdrawn, but rather advanced further until the bottom of upper platen 20, particularly ridge 30, contacts container 58 at a rim area or portion 68 immediately surrounding bore 66, as shown in FIG. 3. Also, fixture 62 is moved downwardly to position spout 60 so that its lower end portion 70 engages upper platen 20, in particular along ridge 26.

With the spout and container rim engaged with ridges 26 and 28 respectively, platen 20 is heated to a temperature above the fusion temperature of polypropylene, yet well below the temperature of the lower platen, for example 600°. The heating continues until generally annular layers of plastic melt are formed in the container and spout, particularly in rim portion 68 around bore 66 and in lower end 70 of the spout. Typically, this heating step requires about fifteen seconds.

Following heating, fixture 62 is raised to withdraw spout 60 from contact with platen 20, fixture 18 is raised to withdraw tool 16 from container 58, and fixture 18 is moved or withdrawn laterally, whereupon fixture 62 is immediately moved downwardly until lower end 70 of the spout engages rim portion 68 of the container. Spout 60 and container 58 are maintained in contact with one another a sufficient time for the fused areas to cool and solidify, typically about ten seconds.

A feature of the present invention resides in the selection of a diameter for spacer 24 less than the diameter of lower platen 22, to form an annular ledge or shoulder 72 at the top of the lower platen. As tool 16 is withdrawn from the container, shoulder 72 encounters any plastic melt inwardly of the desired diameter of bore 66, and lifts the fused material upwardly out of container 58 and deposits it as an annular bead just above rim portion 68 of the container. In the course of cooling after the spout and container are engaged, the bead cools and forms a smooth, continuous annular ridge 74, which reinforces and strengthens the fusion bond.

As seen in FIG. 4, spout 60 can be provided with an enlarged upper portion 76 with internal threads 78 to facilitate connection of a hose, funnel, or the like. It is to be understood that the times and temperatures disclosed are for use in connection with a molding grade of polypropylene, and that different temperatures and heating times would be appropriate in connection with other plastics or other dimensions in the case of polypropylene, particularly as to the thickness of the container and spout walls. In accordance with the invention, therefore, fusion bonds between molded containers and spouts are formed relatively quickly and inexpensively, are not restricted to a circular profile, and are formed without the risk of contamination of the container interior by chips or fragments.

What is claimed is:

1. An apparatus for forming a fusion bond between a container and a tubular spout constructed of a plastic, said apparatus comprising:

a first fixture for supporting a plastic tubular spout in a longitudinal orientation and in spaced apart relation to a plastic container, said first fixture reciprocable to move said spout longitudinally toward and away from a generally transverse wall section of the container;

a heating tool including an inner end segment and an outer end segment spaced apart from and axially aligned with the inner end segment, said inner and outer end segments having selected first and second transverse profiles, respectively;

a first element for heating said inner end segment, and a second element for heating said outer end segment; and a second fixture for supporting said heating tool in a longitudinal orientation, axially aligned with said tubular spout and disposed between said spout and container, said second fixture reciprocable to move the tool longitudinally toward and away from said container wall section to permit the advancing of said inner end segment when heated against and through said container wall section to form a bore having said first selected profile, and allowing further longitudinal advancement of the tool to form an engagement of said outer end section of the tool against a rim area of said container surrounding said bore;

wherein said second fixture further is movable transversely to remove said tool from between the spout and container, thereby permitting longitudinal travel of said first fixture a sufficient amount to move an inner edge portion of said spout into surface engagement with said rim area.

2. The apparatus of claim 1 wherein:

said first fixture is movable to position said inner edge portion against said outer end segment while said outer end segment is engaged with said rim area, whereby said outer end segment, when heated, simultaneously fuses said inner edge portion and said rim area.

3. The apparatus of claim 2 wherein:

said tool further includes an intermediate spacer between said inner and outer end segments, said spacer constructed of a thermally insulative material to thermally isolate said inner and outer end segments from one another, said spacer having a diameter less than that of said inner end segment.

4. The apparatus of claim 3 further including:

a flange depended longitudinally inwardly of an inward face of said inner end segment, and a centrally disposed longitudinal opening running through said tool.

5. The apparatus of claim 4 further including:

an annular first relief concentric on and projected longitudinally outwardly of said outer end segment, said first relief having a diameter corresponding to the diameter of said inner end portion of the spout.

6. The apparatus of claim 5 further including:

an annular second relief concentric on and projected longitudinally inwardly of said outer end segment, said second relief having a diameter substantially equal to the diameter of said rim area.

7. The apparatus of claim 6 wherein:

said first and second reliefs have substantially the same diameter.

8. The apparatus of claim 3 further including:

a means for transversely adjusting the position of said tool with respect to said second fixture to facilitate the axial alignment of said tool with said spout.

9. A process for bonding a tubular plastic spout to a molded plastic container, including the steps of:

supporting a tubular spout in a longitudinal orientation and in spaced apart relation to a generally transverse wall section of a plastic container;

supporting a bore forming means between said tubular spout and said container wall section and in an axial alignment with the spout;

heating said bore forming means to a temperature sufficient to rapidly melt the plastic, and advancing the bore forming means longitudinally inward toward the container wall section until the bore forming means travels through the container wall section, thus to form a bore therethrough;

positioning a heating means against a rim area of the container wall section surrounding said bore, and longitudinally advancing said spout to position a lead end of said spout against said heating means;

heating the heating means above the fusion temperature of the plastic to simultaneously fuse said rim area and said lead end; and withdrawing said heating means and longitudinally advancing said spout until said lead end and rim area engage, and allowing said lead end and rim area to cool, thereby to form a bond to said spout and container.

10. The process of claim 9 wherein:

said step of heating said bore forming means includes heating said bore forming means to a temperature at least 300° F. above the fusion temperature of said plastic.

11. The process of claim 9 including the further step of:

forming an annular bead of plastic melt around said bore immediately outwardly of said rim area after heating said heating means and before longitudinally advancing said spout to cause said lead edge portion and rim area to engage.

* * * * *